United States Patent [19]

Yonemitsu

[11] Patent Number: 5,040,061

[45] Date of Patent: Aug. 13, 1991

[54] METHOD AND APPARATUS FOR TRANSMITTING A COMPRESSED PICTURE SIGNAL BY USING DIFFERENT ENCODING TECHNIQUES FOR PORTIONS OF EACH FRAME

[75] Inventor: Jun Yonemitsu, Kanagawa, Japan

[73] Assignee: Sony Corporation, Tokyo, Japan

[21] Appl. No.: 565,989

[22] Filed: Aug. 13, 1990

[30] Foreign Application Priority Data

Aug. 15, 1989 [JP] Japan .................................. 1-210445

[51] Int. Cl.⁵ ............................................. H04N 7/13
[52] U.S. Cl. ..................................... 358/135; 358/136; 358/342
[58] Field of Search ............... 358/135, 136, 133, 335, 358/342

[56] References Cited

U.S. PATENT DOCUMENTS

| | | | |
|---|---|---|---|
| 4,751,587 | 6/1988 | Asahina | 358/335 |
| 4,837,618 | 6/1989 | Hatori et al. | 358/136 X |
| 4,868,653 | 9/1989 | Golin et al. | 358/136 X |
| 4,914,515 | 4/1990 | Van Luyt | 358/136 X |
| 4,942,465 | 7/1990 | Ohta | 358/136 X |

*Primary Examiner*—Victor R. Kostak
*Attorney, Agent, or Firm*—Lewis H. Eslinger

[57] ABSTRACT

Intraframe coding and interframe coding are selectively employed for generating a compressed digital video frame in order to record a motion video signal on a small capacity recording medium such as a CD ROM. Motion compensation is also employed for effective compression, and motion compensation in only one direction is applied to an area of the frame in which interframe coding is applied that corresponds to an area of a previous frame in which the intraframe coding was applied.

17 Claims, 6 Drawing Sheets

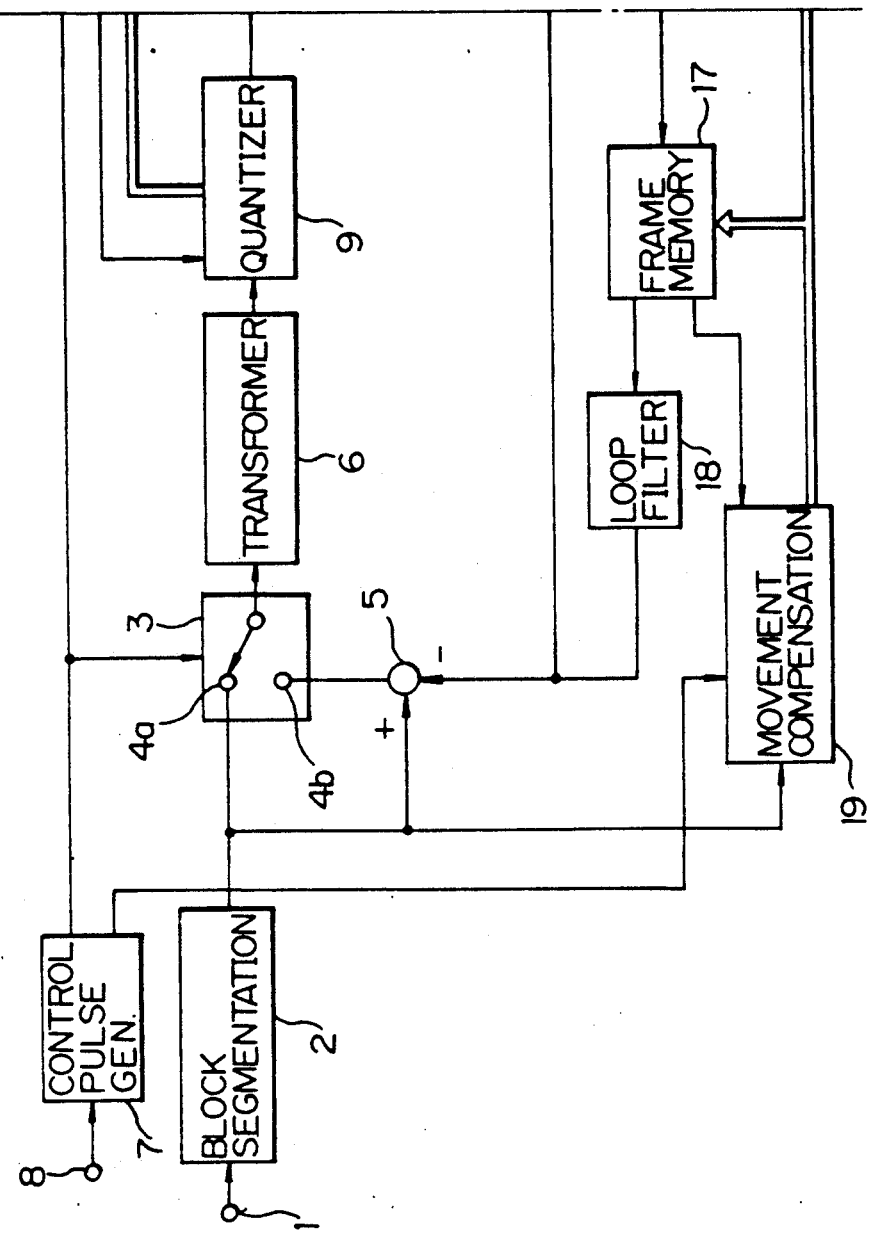

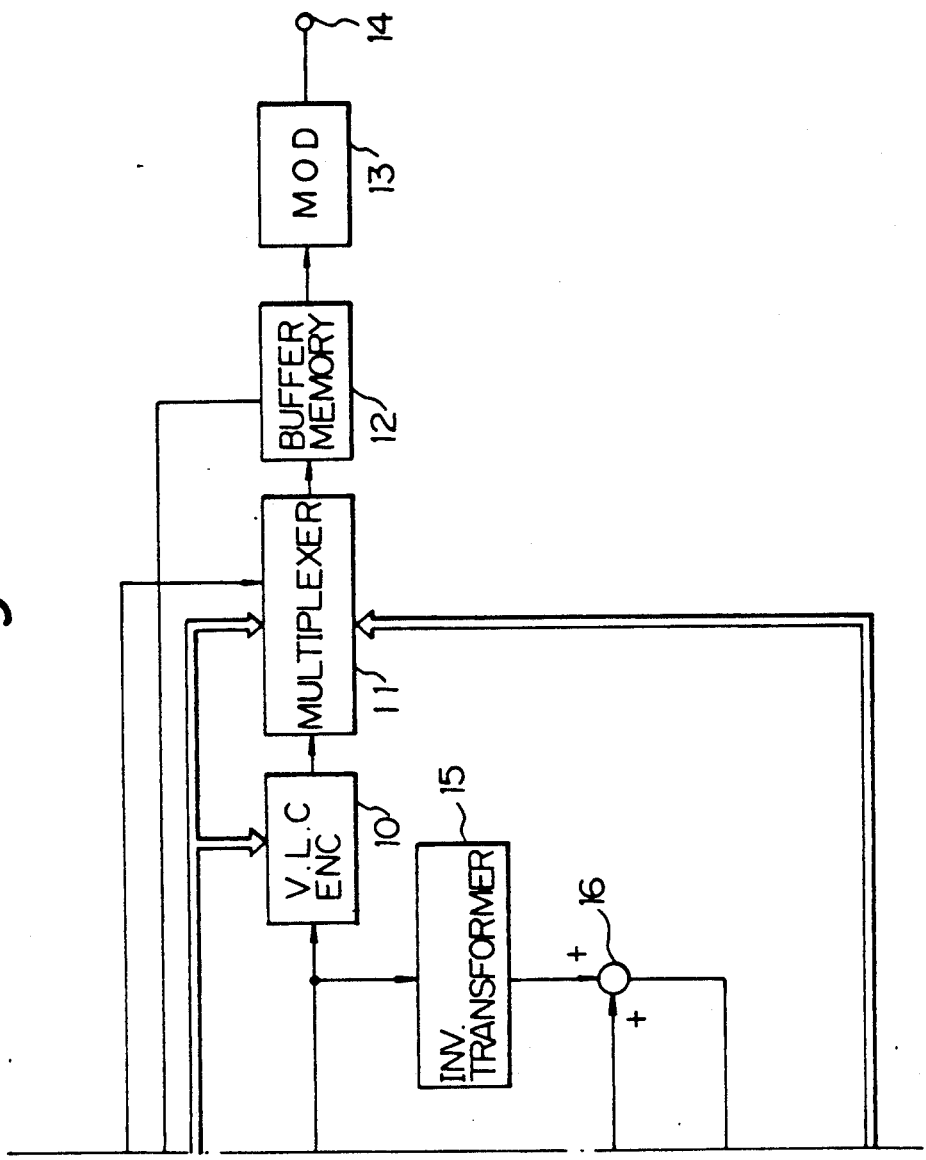

METHOD AND APPARATUS FOR TRANSMITTING A COMPRESSED PICTURE SIGNAL BY USING DIFFERENT ENCODING TECHNIQUES FOR PORTIONS OF EACH FRAME

BACKGROUND OF THE INVENTION

1. Field of the Invention

This invention relates to a transmitting method and apparatus for a compressed picture signal. This invention can be applied to a recording apparatus for recording a moving picture on a disc-like recording medium rotated with constant linear velocity.

2. Description of the Prior Art

As a disc-shaped recording medium that rotates at constant line velocity, a digital audio disc (also called a compact disc and abbreviated as "the CD") is well-known. In a CD, in order to take advantage of digital recording and have greater capacity, a CLV (constant line velocity) system has been adopted. Recording a picture signal as well as a digital audio signal onto the CD has been considered. However, the information amount of the picture signal is much greater than the audio signal, so an effective data compression technique is needed for both still pictures and moving pictures. For compression of picture data, highly efficient encoding is employed.

Highly efficient encoding can be classified into intraframe encoding (one dimension and two dimensions) and interframe encoding. The intraframe encoding performs processing on a scanning line (one dimension), or intrafield or intraframe processing (two dimensions), while the interframe encoding performs three-dimensional interframe processing. The intraframe encoding provides a low compression rate, but it can provide a reproduced picture of high quality. On the other hand, the interframe encoding provides a high compression rate, but there are problems that the picture quality of a reproduced picture is inferior to that in the intraframe encoding. Additionally, in the interframe encoding, a propagation error is generated.

Such highly efficient encoding is employed in a communication system such as a video conference or a video telephone, which requires the high compression rate. To prevent the generation of a propagation error, the first picture is subjected to intraframe processing and the remaining ones are subjected to interframe processing. This is called adaptive selection of the intraframe processing and the interframe processing in these communication systems. However, in the case of the CD, data can be obtained from the CD intermittently at the time of a special reproduction such as random access, search or reverse. For this reason, when a frame difference is encoded with the interframe processing as mentioned above, there is a problem that a reproduced picture cannot be provided.

To solve this problem, a system where one picture is completely subjected to the intraframe processing periodically and where the remaining pictures are subjected to the efficient interframe processing is proposed. With this system, a reproduced picture can be provided intermittently by reproducing intraframe-encoded picture data from the CD at the time of the above-mentioned special reproduction. Consequently, the special reproducing operation is possible.

As one example, one frame is subjected to the intraframe encoding at a period which is equal to six continuous frames in time, and the remaining five frames are subjected to the interframe processing. As a result, as shown in FIG. 1, encoded data F1 (indicated by hatching area) corresponding to picture data of the first frame, which is generated by the intraframe encoding, is positioned in a two-frame period, for example, of the six frames. Encoded data is generated in the remaining four-frame period so that encoded data F2 to F6 correspond to picture data of the second frame to the sixth frame.

FIG. 2 shows a part of the innermost circumference side of a spiral track of the CD. Recording data is shown in FIG. 3A in the state where the track is developed linearly by the x—x' line in the radial direction of the disc. As described above, the period of the intraframe encoding is set at 6 frames, and data generated in the intraframe encoding (indicated by each hatched area) is inserted over a two-frame period. The intraframe-encoded data is recorded every six frames from data F1 corresponding to the first frame in a part of the disc shown in FIG. 2.

During the special reproduction operation, for example, the pick-up feed speed in the diameter direction of the disc is performed at high speed as compared with the normal reproduction operation and during the search operation, where a track jump takes place, only data subjected to the intraframe encoding is reproduced sequentially as shown at the arrows of FIG. 3A. Reproduction data corresponding to FIG. 3A is shown in FIG. 3B. In FIG. 3B, each hatched area represents the cue time (i.e., the total time required for a track jump of the pick-up and for reaching the next reproduction of intraframe encoded data). Further, in FIG. 3B, the display operation of a reproduced picture corresponding to reproduced data is shown. Clearly, a reproduced picture P1 provided by the intraframe decoding of the reproduction data F1 is repeatedly displayed on a monitoring device until a reproduced picture P7 of the next seventh frame is obtained. As will be understood from FIG. 3B, a postsix frame picture is provided every two-frame or three-frame period.

Since the efficiency of the intraframe processing is poor in the encoding system which uses the above-mentioned special reproduction, data generated in the intraframe processing exceeds one frame requiring a two-frame period (the above-stated example) or a much longer period. Therefore, at the time of search operation, the same picture is repeatedly reproduced until the reproduction of data subjected to the next intraframe processing is completed. For this reason, there is a disadvantage that the change of a reproduced picture at the time of reproduction is slow.

To solve this disadvantage, a proposal that the encoding of a frame to be subjected to the intraframe processing is done by dividing the frame into two stages has been made. Specifically, in the first stage, after an original picture is subjected to band restriction, one half of the data is thinned out in the longitudinal and lateral directions to reduce the data amount to one fourth. By processing this data, the generated data amount is kept within one frame. At the second stage, the picture provided in the first stage is returned to its original size by interpolation, and after obtaining a difference between the picture and the original picture, the difference is encoded.

According to this step-by-step encoding system, a picture of low resolution provided in the first stage is reproduced at the time of search. A reproduced picture which varies smoothly every frame time can consequently be obtained. However, there are problems that the circuit size becomes large since circuits for the thinning-out and the interpolation are needed because of the two stages of decoding and that the efficiency is deteriorated.

OBJECTS AND SUMMARY OF THE INVENTION

An object of the invention is therefore to provide a transmitting method and an apparatus for a picture signal capable of solving the problem that the same picture is repeatedly displayed over several frames at the time of search while not increasing the circuit size.

According to an aspect of the invention there is provided a method for transmitting a compressed picture signal, comprising the steps of:

decoding a single frame picture signal into a plurality of segmented areas;

employing an intraframe coding onto one of the plurality of segmented areas and an interframe coding onto remaining of the plurality of segmented areas;

quantizing both of one and remaining areas; and modulating the quantized one and remaining areas for transmitting.

According to another aspect of the invention, there is provided an apparatus for generating a compressed picture signal so as to be transmitted by using a narrow band transmission capacity comprising:

means for dividing a single frame picture signal into a plurality of segmented areas;

means for orthogonally transforming at least one of the plurality of segmented areas so as to generate an intraframe coded signal;

means for generating a difference between present and adjacent picture frames, the generating means including a motion compensation circuit for reducing the amount of data of the difference;

means for orthogonally transforming the difference so as to generate an interframe coded signal of the remaining of the plurality of areas; and means for transmitting the one and remaining of the plurality of segments area as the compressed picture signal.

The above, and other, objects, features and advantages of the present invention will become readily apparent from the following detailed description thereof which is to be read in connection with the accompanying drawings.

BRIEF DESCRIPTION OF THE DRAWINGS

FIG. 4 is a block diagram of one embodiment of this invention;

DETAILED DESCRIPTION OF THE PREFERRED EMBODIMENTS

Figure 1:
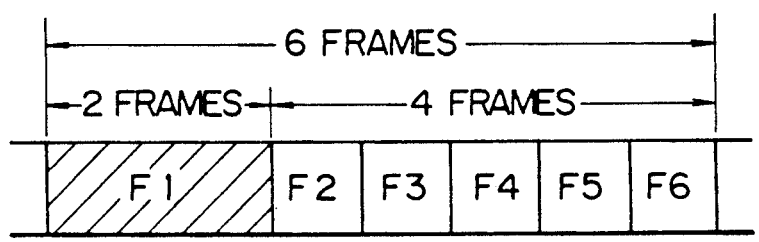
FIG. 1 is a schematic diagram for describing conventional encoding.
Figure 2:
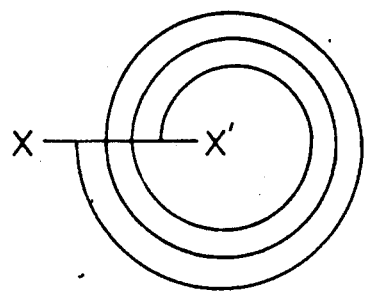
FIG. 2 is a schematic diagram showing a part of a track of a disc-shaped recording medium to which the invention is applicable.
Figure 3A:
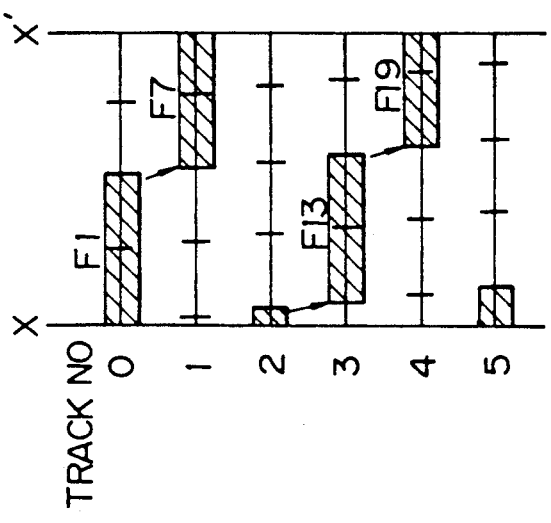
FIGS. 3A and 3B are diagrammatic representations useful in describing a conventional search operation.
Figure 3B:
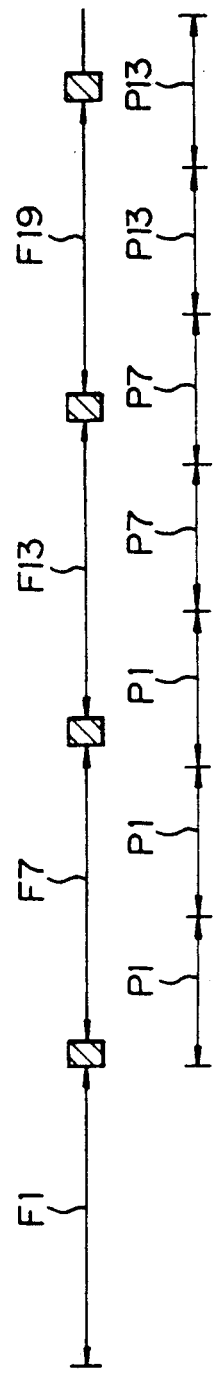

Hereunder, one embodiment of this invention will be described referring to the drawings. FIG. 4 shows a recording circuit to which the invention is applicable. In a CD ROM (a CD for which rewriting is impossible), the recording circuit is applied to a master disc manufacturing system. This embodiment shows an example where the DCT (Discrete Cosine Transform) is employed for highly efficient encoding. However, the invention is not limited to the DCT, and other conversion codes can be used. Also, highly efficient codes for the subsampling system other than conversion encoding and ADRC, for performing encoding adaptively to a dynamic range may be employed. This adaptive encoding involves a difference between the maximum value and the minimum value of data for every block.

In FIG. 4, picture data is supplied to an input terminal indicated at 1. The picture data is non-interlaced data in which one picture is made to be one frame. The picture data may be either monochrome or color. Input picture data is supplied to a block segmentation circuit 2, and the order of data is converted into a block structure of (m×m) constructed by segmenting one frame. The output signal of the block segmentation circuit 2 is supplied to one input terminal 4a of a switch circuit 3 and a subtracter 5. Data of a previous frame, which is formed as mentioned later, is given to the subtracter 5, and a frame difference is provided from the subtracter 5. The frame difference is given to the other input terminal 4b of the switch circuit 3. The output signal of the switch circuit 3 is supplied to a transformer 6 of the DCT.

The switch circuit 3 is periodically switched by control pulses from a control pulse generator 7. A synchronization signal, which is in synchronism with the input picture data, is supplied from an input terminal 8 to the control pulse generator 7. As a result, control pulses synchronizing with the input picture data are formed. Intraframe encoding is done when the switch circuit 3 selects a picture signal from the input terminal 4a, and when the switch circuit 3 selects a picture signal from the input terminal 4b, interframe encoding is made. As described later, the intraframe encoding and the interframe encoding are switched, so that one frame is divided into five-divided areas in the longitudinal direction, where one of the divided areas is subjected to the intraframe encoding, and the remaining four-divided areas are subjected to the interframe encoding.

At the transformer 6, the processing of two-dimensional cosine conversion is made, so that the transformer 6 generates coefficient data. The coefficient data is supplied to a quantization circuit 9, and the quantization of the coefficient data is performed at a predetermined quantization step. The output signal of the quantization circuit 9 is sent to a variable length encoder 10 to be subjected to the processing of run-length encoding and Hafman encoding. The output signal of the variable length encoder 10 is supplied to a multiplexer 11. Data of the quantization step from the quantization circuit 9 is fed to the multiplexer 11, and a movement vector from a movement compensating circuit 19 is given to the multiplexer 11. This other information and the coefficient data are converted into transmission data at the multiplexer 11. The information of the quantization step is also given to the variable length encoder 10.

The output signal of the multiplexer 11 is fed to a buffer memory 12. Transmission data read out of the buffer memory 12 is given to a modulator 13 and subjected to the digital modulation processing such as EFM (a modulation system for converting 8-bit data into 14-bit data). The transmission data taken out at an output terminal 14 of the modulator 13 is recorded on a disc. An encoder for error detection/correction is connected to the output terminal 14 although not shown. The transmission data with any error corrected and coded is given to a pickup for recording.

The buffer memory 12 is provided to control the data rate of transmission data so as not to exceed the capacity of a transmission line. A control signal for controlling the quantization step is supplied from the buffer memory 12 to the quantization circuit 9. The control is designed so that when there is too much transmission data, the quantization step is made coarse. Similarly, when there is little transmission data, the quantization step is made fine.

The output signal of the quantization circuit 9 is fed to an inverse transformer 15, and the output signal (frame difference) of the inverse transformer 15 is given to an adder 16. The output signal of the adder 16 is sent to a frame memory 17. A reproduced picture is reproduced at the frame memory 17. The output signal of the frame memory 17 is fed to the subtracter 5 and the adder 16 through a loop filter 18. The loop filter 18 is provided to reduce random noise and block distortion generated in the quantization of the coefficient data at the quantization circuit 9.

Further, a movement compensating circuit 19 is provided. The picture data (the output signal of the block segmentation circuit 2) of the present frame and the picture frame (the output signal of the frame memory 17) of the previous frame are supplied to the movement compensating circuit 19. At the movement compensating circuit 19, a movement vector indicative of a movement between frames is detected, and the movement vector is supplied to the frame memory 17 and the multiplexer 11. The control pulses are given from the control pulse generator 7 to the movement compensating circuit 19 to switch between the case where movement compensation in both of the longitudinal and lateral directions is made and the case where movement compensation in the lateral direction only is made. Also, a pulse signal for controlling the switch circuit 3 from the pulse generator 7 is supplied to the multiplexer 11 as an ID signal for distinguishing the intraframe encoding and the interframe encoding and is added to the transmission data.

The above-mentioned interframe encoding is a hybrid encoding of DCT and DPCM and performs cosine conversion of a frame difference provided by DPCM so as to achieve a high compression rate.

The above-described encoding process of this embodiment will be explained referring to FIG. 5.

Figure 5:
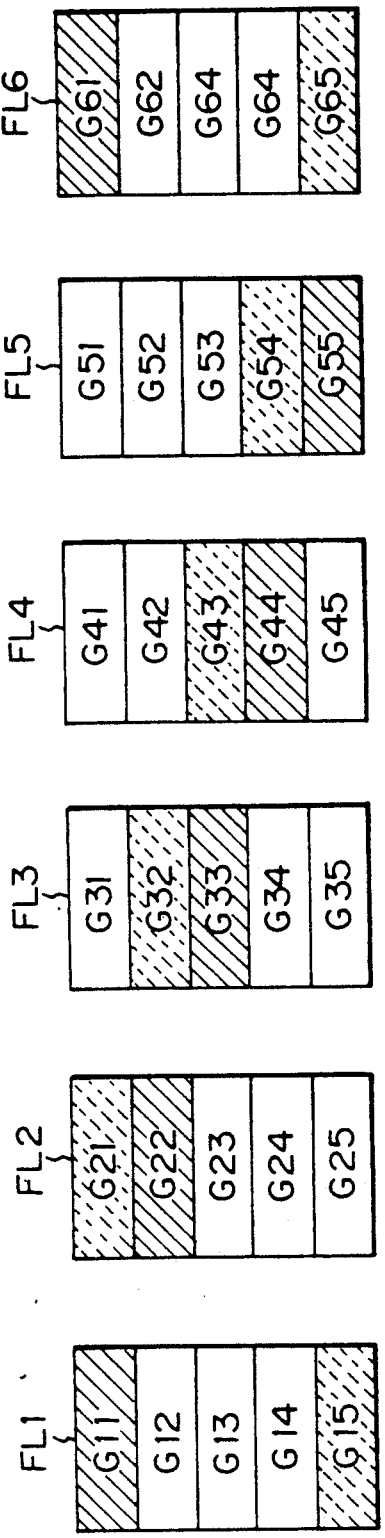
FIG. 5 is a schematic diagram for describing encoding.

FIG. 5 shows pictures FL1 to FL6 of six frames continuous in time respectively. Each frame is divided into n areas, for example, 5 areas, so that each frame has boundaries in the horizontal scanning direction. Encoded data of each divided area (called a "block group") of frame FLi is indicated as Gi1, Gi2, ..., Gi5. One block group of the five block groups is subjected to the intraframe encoding and the remaining four block groups are subjected to the interframe encoding. In FIG. 5, the area indicated by a hatched solid line shows a block group to be processed by the intraframe encoding. As seen from FIG. 5, the position of the block group subjected to the interframe encoding is shifted toward the lower side every frame. In addition, with respect to the block group corresponding to the position subjected to the intraframe encoding in the previous frame among the block groups processed by the interframe encoding, only movement compensation in the horizontal direction is done at the movement compensating circuit 19 as shown as a hatched area of broken lines. The movement compensation in the horizontal direction means that movement compensation is carried out among the block groups. The other block groups subjected to the interframe encoding receive the movement compensation in the lateral and longitudinal directions.

By dividing one frame picture into five block groups, performing intraframe encoding with respect to one block group thereof and performing interframe encoding with respect to the remaining block groups, the amount of generated encoded data has a length which is contained in one frame period.

Figure 6A:
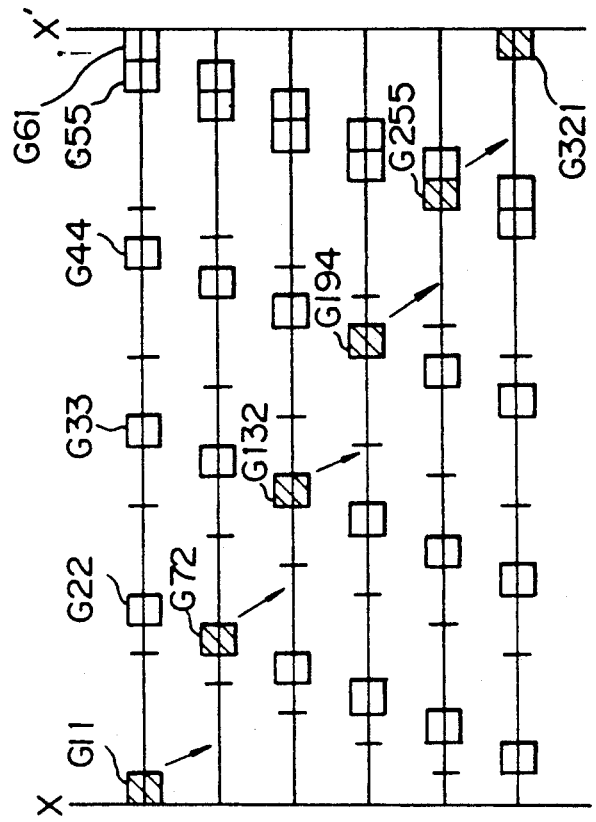
FIGS. 6A and 6B are diagrammatic representations useful in describing a search operation of one embodiment of the invention.
Figure 6B:
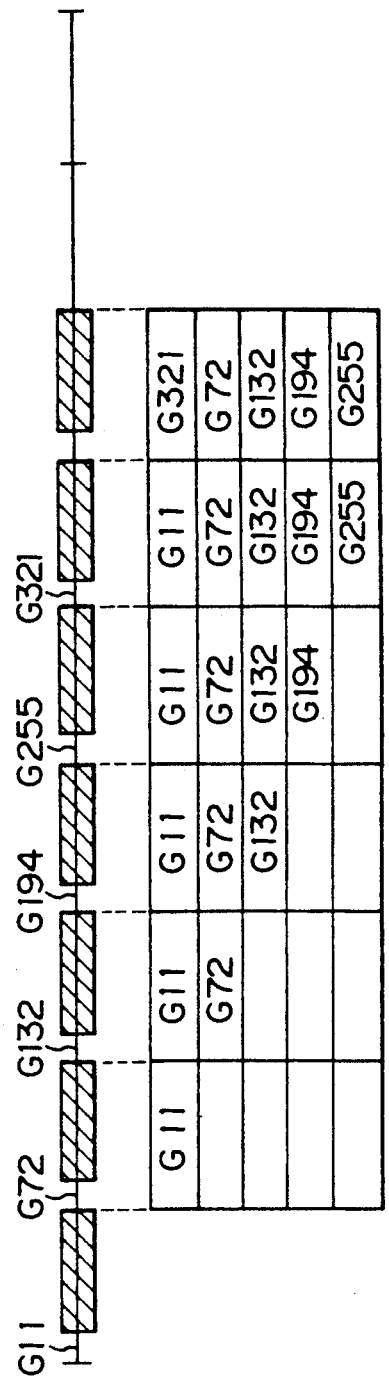

In the special reproduction operation, for instance, in the search operation where the pickup feed speed in the diameter direction of the disc is performed at high speed as compared with the normal reproduction operation and where a track jump occurs, only data of the block group subjected to the intraframe encoding is read out sequentially as shown at the arrows of FIG. 6A. Reproduction data corresponding to FIG. 6A is shown in FIG. 6B. In FIG. 6B, a hatched area represents the cue time (that is, the total of time required for the track jump and the next reproduction of the intraframe-encoded data). Further, in FIG. 6B, the display operation of a reproduced picture corresponding to reproduced data is shown. Namely, by the intraframe encoding of reproduction data G11, a reproduced picture is displayed on one fifth of the screen of the upper portion of a monitor device. Hereunder, similarly, reproduction data of data G72, G132, G194, G255, ... is decoded to display a reproduced picture over one fifth of the width sequentially. As a result, when a five-frame period elapses after the start of search reproduction, one decoded picture can be provided and one reproduced picture is always displayed on the monitor device in subsequent frames.

Therefore, at the time of the search operation, a change of one fifth of the width of a reproduced picture occurs every frame. This reproduced picture is a lateral stripe pattern. However, it can be fully used for cue at the time of search.

This invention is also applicable to the case where recording of a picture signal onto a discshaped recording medium other than the CD-ROM is made with highly efficient encoding.

This invention enables a decrease of the recording data amount by subjecting a part of a picture of one frame to intraframe encoding and the remaining parts to interframe encoding. Also, the invention allows reproduced pictures varying every frame to be provided utilizing data subjected to the intraframe encoding at the time of a special reproduction such as search. Further, there are advantages that this invention dispenses with circuits for thinning out and interpolation and that the circuit size can be decreased.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A method for transmitting a sequence of single frame picture signals as a compressed picture signal, comprising the steps of:

dividing a single frame picture signal into a plurality of segmented areas;

encoding at least one of said plurality of segmented areas using intraframe coding, where said at least one of said plurality of segmented areas is selected at regular intervals, and encoding the remainder of said plurality of segmented areas using interframe coding;

quantizing said intraframe and interframe coded areas; and modulating the quantized intraframe and interframe coded areas for transmission.

2. An apparatus for generating a compressed picture signal to be transmitted using a narrow band capacity, comprising:

means for dividing each single frame of a plurality of frames in a picture signal into a plurality of segmented areas;

means for orthogonally transforming at least one of said plurality of segmented areas to generate an intraframe coded signal, where said at least one of said plurality of segmented areas is selected at regular intervals;

means for generating a difference signal between present and adjacent picture frames, said generating means including a motion compensation circuit for reducing the amount of data of said difference signal;

means for orthogonally transforming said difference signal to generate an interframe coded signal for each remaining one of said plurality of segmented areas; and means for transmitting said plurality of intraframe and interframe coded areas as said compressed picture signal.

3. The apparatus according to claim 2 in which said motion compensation circuit detects motion between said frame picture signals and a frame picture memory circuit.

4. An apparatus for generating a compressed picture signal to be transmitted using a narrow band capacity, comprising:

means for dividing each single frame of a plurality of frames in a picture signal into a plurality of segmented areas;

means for orthogonally transforming at least one of said plurality of segmented areas to generate an intraframe coded signal, where said at least one of said plurality of segmented areas is selected at regular intervals;

means for generating a difference signal between present and adjacent picture frames, said generating means including a motion compensation circuit for reducing the amount of data of said difference signal by compensating for motion in only one direction for one of said interframe coded areas which corresponds to one intraframe coded area of an adjacent frame;

means for orthogonally transforming said difference signal to generate an interframe coded signal for each remaining one of said plurality of segmented areas; and means for transmitting said plurality of intraframe and interframe coded areas as said compressed picture signal.

5. The apparatus according to claim 4, in which said dividing means divides the frame picture signal vertically, and said one direction is a horizontal direction of said frame picture signal.

6. The apparatus according to claim 4, in which said dividing means divides the frame picture signal horizontally, and said one direction is a vertical direction of said frame picture signal.

7. An apparatus for coding a sequence of single frame picture signals so that the coded single frame picture signals can be recorded on a disc-shaped recording medium, comprising:

means for dividing a frame of the picture signal into a plurality of segmented areas;

means for intraframe coding at least one area of said plurality of segmented areas, where said at least one area of said plurality of segmented areas is selected at regular intervals; and means for interframe coding the remaining areas of said plurality of segmented areas.

8. The apparatus according to claim 7, further comprising a modulation circuit for modulating said intraframe coded area and said interframe coded areas for recording on a disc-shaped recording medium.

9. The apparatus according to claim 8, in which said interframe coding means includes a detector for detecting motion between frames of said picture signal.

10. The apparatus according to claim 9, in which said interframe coding means further includes a frame memory for storing a single frame picture signal and a subtractor for producing a difference signal derived from an output signal of said frame memory and a present frame of the picture signal.

11. The apparatus according to claim 10, in which said motion detector controls said frame memory for motion compensation of the single frame picture signal stored in said frame memory to reduce the amount of data in said difference signal.

12. An apparatus for coding a sequence of single frame picture signals so that the coded single frame picture signal can be recorded on a disc-shaped recording medium, comprising:

means for dividing a frame of the picture signal into a plurality of segmented areas;

means for intraframe coding at least one area of said plurality of segmented areas, where said at least one area of said plurality of segmented areas is selected at regular intervals; and means for interframe coding the remaining areas of said plurality of segmented areas which includes a detector for detecting motion between frames of said picture signal, a frame memory for storing a single frame picture signal and a subtractor for producing a difference signal derived from an output signal of said frame memory and a present frame of the picture signal where said motion detector includes means for controlling said frame memory to perform full motion compensation for shifting a stored frame picture signal in both horizontal and vertical directions and to perform a partial motion compensation for shifting said stored frame picture signal in one of said directions.

13. The apparatus according to claim 12, in which said partial motion compensation is performed on one of said plurality of segmented areas of a present frame, a corresponding segmented area of which in a previous frame is processed by said intraframe coding, and said full motion compensation is performed on said remaining segmented areas of the present frame.

14. The apparatus according to claim 13, in which said dividing means divides said frame picture signal in a vertical direction.

15. The apparatus according to claim 14, in which said partial motion compensation is employed for shifting the stored frame picture signal only in a horizontal direction.

16. The apparatus according to claim 13, in which said dividing means divides said frame picture signal in a horizontal direction.

17. The apparatus according to claim 16, in which said partial motion compensation is employed for shifting the stored frame picture signal only in a vertical direction.

* * * * *